United States Patent
Lane

(10) Patent No.: US 11,365,838 B1
(45) Date of Patent: Jun. 21, 2022

(54) CONNECTOR ASSEMBLY AND METHODS OF USE

(71) Applicant: Drug Careers, Inc., Clarksburg, NJ (US)

(72) Inventor: Lisa A. Lane, Clarksburg, NJ (US)

(73) Assignee: Drug Careers, Inc., Clarksburg, NJ (US)

( * ) Notice: Subject to any disclaimer, the term of this patent is extended or adjusted under 35 U.S.C. 154(b) by 0 days.

(21) Appl. No.: 17/002,769

(22) Filed: Aug. 25, 2020

Related U.S. Application Data

(60) Provisional application No. 62/891,582, filed on Aug. 26, 2019.

(51) Int. Cl.
| | | |
|---|---|---|
| *F16L 33/28* | (2006.01) | |
| *F16L 33/207* | (2006.01) | |
| *F16L 33/16* | (2006.01) | |

(52) U.S. Cl.
CPC ........... *F16L 33/2076* (2013.01); *F16L 33/16* (2013.01); *F16L 33/28* (2013.01)

(58) Field of Classification Search
CPC ....... F16L 33/20; F16L 33/16; F16L 33/2073; F16L 33/2071; F16L 33/207; F16L 19/025; F16L 33/2076; F16L 33/28; E03C 1/086
USPC ...................................................... 285/46, 8
See application file for complete search history.

(56) References Cited

U.S. PATENT DOCUMENTS

| | | | | |
|---|---|---|---|---|
| 589,362 | A * | 8/1897 | Miles ................... | E21B 2200/01 277/322 |
| 846,905 | A * | 3/1907 | Bruen ................... | F16L 17/025 277/607 |
| 964,579 | A * | 7/1910 | Stephens ............... | F16L 19/025 285/148.13 |
| 969,216 | A * | 9/1910 | Stephens ............... | F16L 33/223 285/247 |
| 1,058,330 | A * | 4/1913 | Page ......................... | F04F 5/10 417/181 |
| 1,071,165 | A * | 8/1913 | Manning ................... | F04F 5/10 417/181 |
| 1,202,506 | A * | 10/1916 | Galloway ................ | F16L 37/48 285/8 |
| 1,509,484 | A * | 9/1924 | Powell ..................... | F16L 19/02 285/246 |
| 1,794,581 | A * | 3/1931 | Burdick ..................... | E03B 9/20 251/308 |
| 1,984,347 | A * | 12/1934 | Sutton ..................... | F16L 37/48 285/8 |
| 2,051,211 | A * | 8/1936 | Hagopian ............... | F16L 37/48 285/8 |
| 2,326,479 | A * | 8/1943 | Mejdrich ................ | F16L 37/48 285/8 |
| 2,507,535 | A * | 5/1950 | Madsen ................... | F16L 37/48 285/8 |

(Continued)

*Primary Examiner* — David Bochna
(74) *Attorney, Agent, or Firm* — Favorito Law LLP; Carolyn A. Favorito

(57) ABSTRACT

A connector assembly may include an elastomeric connector comprising an approximately perpendicular flange at a distal end thereof and an opening therethrough; and a rigid compression fitting having an opening aligned with the opening of the elastomeric connector. The connector assembly may be used with a converter hose. Related methods include attaching the converter hose to a shower head, faucet or spigot.

25 Claims, 13 Drawing Sheets

(56) References Cited

U.S. PATENT DOCUMENTS

| | | | | |
|---|---|---|---|---|
| 2,584,044 | A * | 1/1952 | Osrow | F16L 37/48 |
| | | | | 285/8 |
| 3,381,982 | A * | 5/1968 | Elek | F16L 33/22 |
| | | | | 285/133.4 |
| 3,638,968 | A * | 2/1972 | Barks | F16L 37/48 |
| | | | | 285/8 |
| 4,223,919 | A * | 9/1980 | Kurachi | F16L 19/065 |
| | | | | 285/248 |
| 4,413,362 | A * | 11/1983 | Chianco | E03C 1/06 |
| | | | | 239/211 |
| 5,028,077 | A * | 7/1991 | Hurst | F16L 27/107 |
| | | | | 285/8 |
| 5,154,453 | A * | 10/1992 | Nishio | F16L 19/041 |
| | | | | 285/342 |
| 5,743,570 | A * | 4/1998 | Garland | E03C 1/086 |
| | | | | 285/148.22 |
| 5,772,616 | A * | 6/1998 | Competiello | A61C 17/032 |
| | | | | 601/165 |
| 5,951,060 | A * | 9/1999 | Fukano | F16L 47/041 |
| | | | | 285/92 |
| 6,315,220 | B1 * | 11/2001 | Grubb | E03C 1/086 |
| | | | | 239/588 |
| 8,109,539 | B2 * | 2/2012 | Krohn | F16L 17/00 |
| | | | | 285/322 |
| 10,393,300 | B1 * | 8/2019 | Lane | F16L 37/04 |
| 2014/0333059 | A1 * | 11/2014 | Montoya | E03C 1/0404 |
| | | | | 285/8 |

* cited by examiner

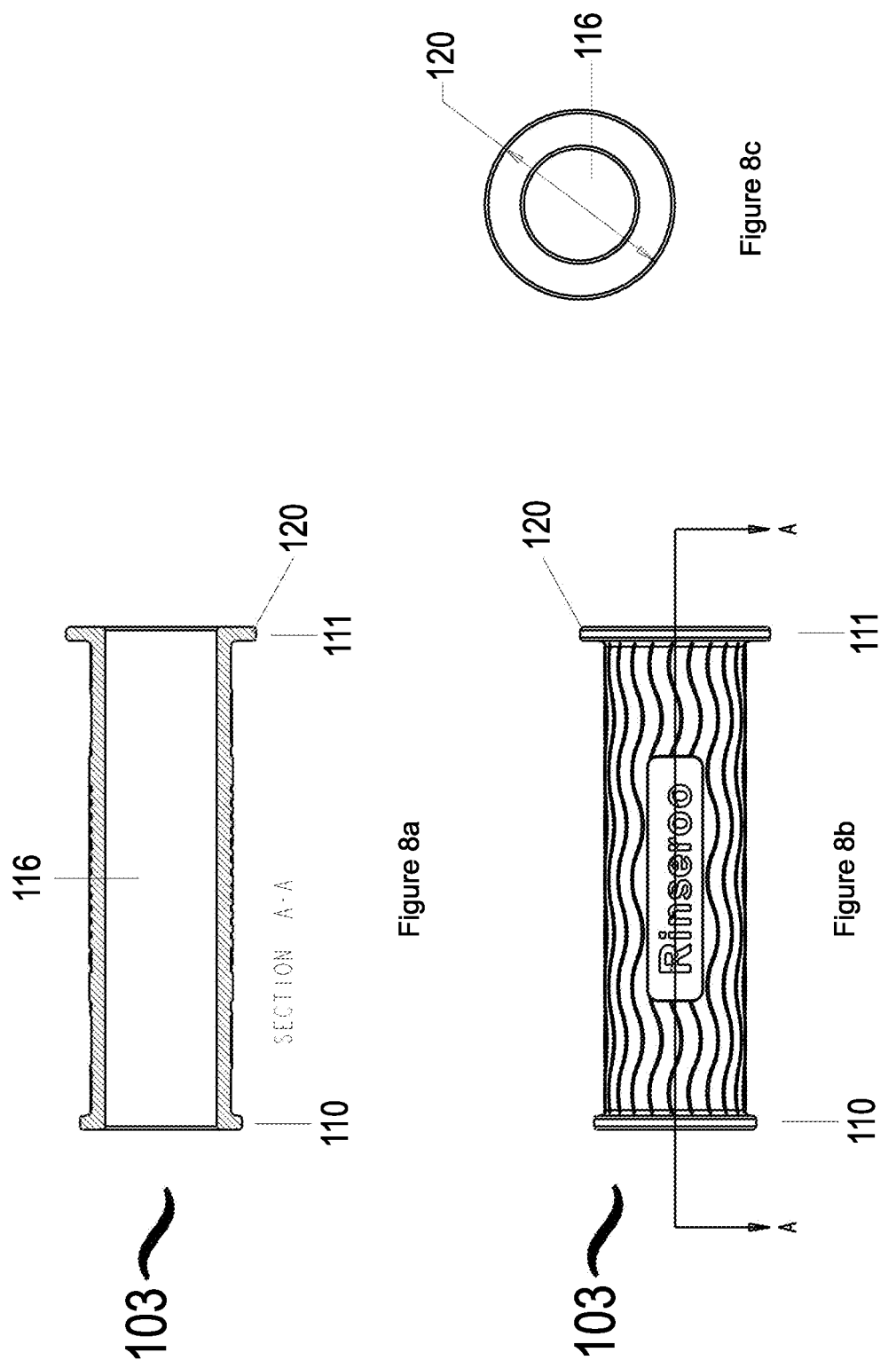

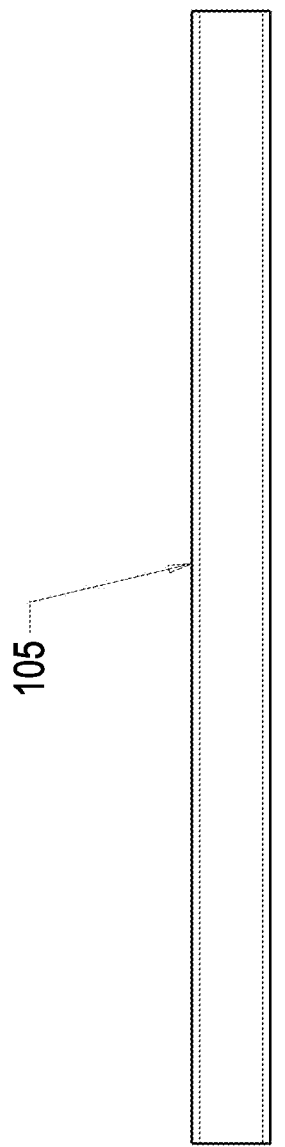
Figure 9b
105
Figure 9a
FIGURE 9

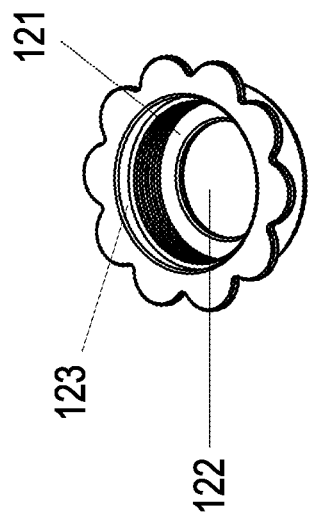
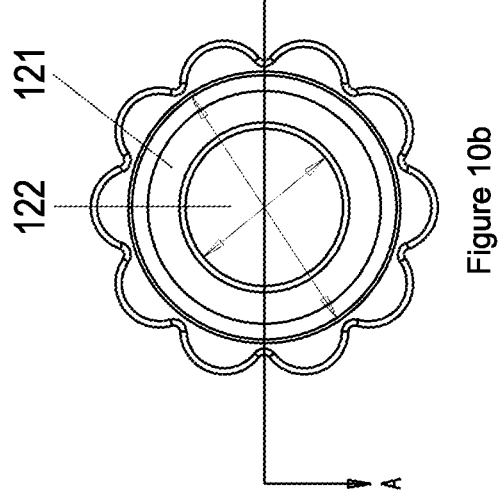
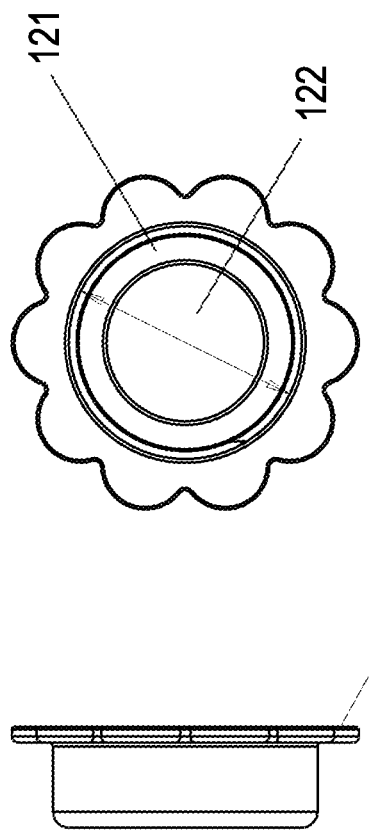
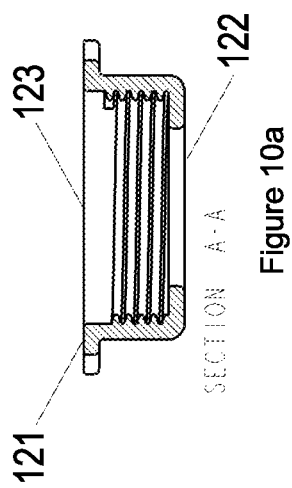
FIGURE 10

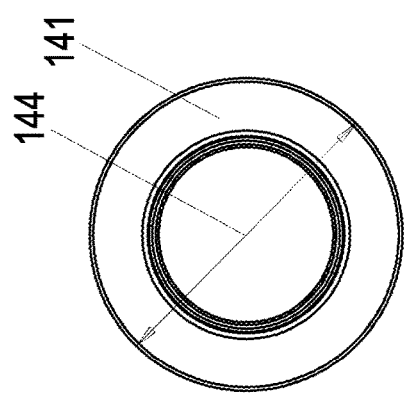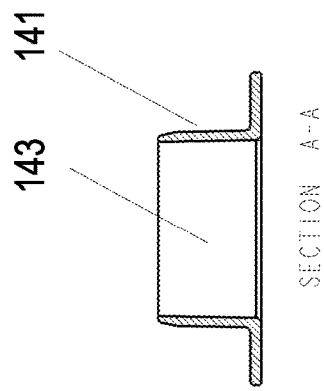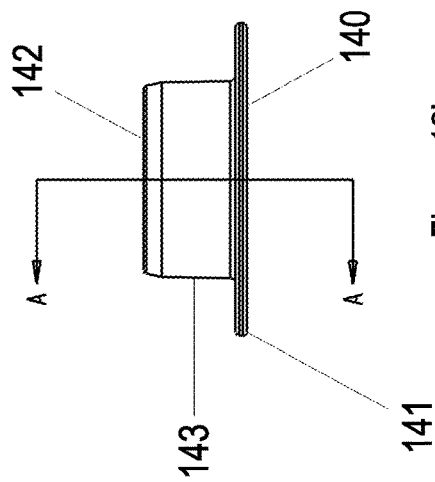
FIGURE 12

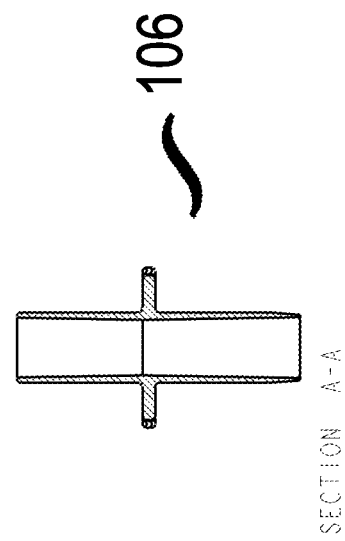
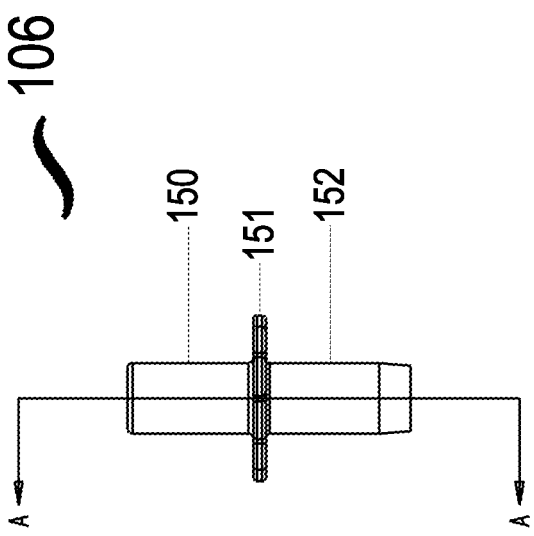
FIGURE 13

CONNECTOR ASSEMBLY AND METHODS OF USE

CROSS REFERENCE TO RELATED APPLICATIONS

This application is claims priority to U.S. Provisional Application Ser. No. 62/891,582 filed on Aug. 26, 2019, the entire contents of which is incorporated by reference in its entirety.

FIELD

The device is in the field of converter hoses and related methods of use.

There is a need in the art for a converter hose with a self-sealing, easy to affix, slip-on/slip off connector which converts any size shower head or faucet to a hose, ideal for safely and effectively rinsing showers, animals, babies and household item, wherein the connector is securely attached to the remainder of the converter hose.

BACKGROUND OF THE INVENTION

The converter hose referenced herein is related to U.S. application Ser. No. 15/061,816, which issued as U.S. Pat. No. 10,393,300, both of which are incorporated herein by reference.

SUMMARY

In some aspects, a connector assembly comprises an elastomeric connector comprising an approximately perpendicular flange ("connector flange") at a distal end thereof and an opening therethrough; and a rigid compression fitting having an opening that aligns with the opening of the elastomeric connector; wherein the rigid compression fitting comprises a female cap, a double sided male component, and an insert having dimensions to fit therebetween; wherein the insert comprises a tube and an approximately perpendicular flange ("insert flange"). The insert flange may be proximate a first end of the insert and is about the same circumference as the connector flange; and the tube may be proximate a second end of the insert and has a length that is shorter than a length of the elastomeric connector and has an outer circumference that is about the same as an inner circumference of the elastomeric connector. In some aspects, the female cap and the first end of the double sided male component are threaded. In some aspects, the rigid compression fitting comprises a cam and follower. In some aspects, the double sided male component comprises a male end that is complementary to the female cap ("complementary male end"), and a male end that inserts into a hose ("male hose end") opposite the complementary male end; wherein the female cap comprises a rim that forms a first opening approximately the same dimension as the outer circumference of the elastomeric connector; wherein a second opening in the female cap has a larger circumference than the insert flange; wherein when assembled: the tube is positioned inside the distal end of the elastomeric connector and the insert flange rests against the connector flange; most of the elastomeric connector and a portion of the tube extend through the first opening of the female cap; the connector flange rests against an inner surface of the rim; and the insert flange and the connector flange are compressed against the rim forming a seal.

In some aspects, the connector assembly comprises an elastomeric connector comprising an approximately perpendicular flange ("connector flange") at a distal end thereof and an opening therethrough; and a rigid compression fitting having an opening aligned with the opening of the elastomeric connector comprising a female cap and a double sided male component and an insert a size to fit therebetween; wherein the insert comprises a tube and an approximately perpendicular flange ("insert flange"); wherein the insert flange is proximate a first end of the insert and is about the same circumference as the connector flange; and wherein the tube is proximate a second end of the insert and has a length that is shorter than a length of the elastomeric connector and has an outer circumference that is about the same as an inner circumference of the elastomeric connector; wherein the double sided male component comprises a male end that is complementary to the female cap ("complementary male end"), a male end that is inserted into a hose ("male hose end") opposite the complementary male end, and a transition plane between a larger opening of the complementary male end and a smaller opening in the male hose end, wherein the transition plane is proximate the male hose end; wherein the female cap comprises a rim that forms a first opening approximately the same dimension as the outer circumference of the elastomeric connector; wherein a second opening in the female cap has a larger circumference than the insert flange; wherein the tube is positioned inside the distal end of the elastomeric connector and the insert flange rests against the connector flange; wherein most of the elastomeric connector and some of the tube extend through the first opening of the female cap; wherein the connector flange rests against an inner surface of the rim; and wherein the insert flange and the connector flange are compressed between the rim and the transition plane to form a seal.

In some aspects, the converter hose comprises a hose that may be more rigid than the elastomeric connector and less rigid than the compression fitting. In some aspects, the hose may be more rigid than the elastomeric connector and less rigid than the compression fitting.

In some aspects, the elastomeric connector has a wall thickness of about $\frac{1}{32}$" to $\frac{1}{2}$" or about $\frac{1}{16}$" to $\frac{1}{4}$". In some aspects, the elastomeric connector has properties and dimensions wherein when in use a single elastomeric connector self seals about peripheries of a round fixture and a rectangular fixture.

In some aspects, the elastomeric connector may comprise a thermoplastic elastomer having a durometer hardness Shore Type A or Shore Type 00 value of about 1-50 such as about 1-30. In some aspects, the thermoplastic elastomer connector comprises a thermoplastic elastomer that may have a tear strength of about 1-35 kN/m. In some aspects, the elastomeric connector may have a length of about 3-10 inches. In some aspects, the hose comprises silicon or polyvinyl chloride.

In some aspects, a nozzle may be attached to a second end of the hose.

In some aspects, a single elastomeric connector has properties and dimensions capable of self sealing about peripheries of fixtures comprising both a 3" diameter shower head and a 2" by 1.5" rectangular tub spout when in use. In some aspects, the properties and the dimensions provide a surface area about peripheries of various sized fixtures to counter a force of a flow rate from the various sized fixtures when in use.

In some aspects, a method of using the converter hose may comprise attaching the proximal end of the elastomeric connector to a fixture or the end of a vacuum cleaner hose.

In some aspects, a method may comprise flowing water through the converter hose, wherein less than 1% of the water flowing through the converter hose escapes the proximal end of the elastomeric connector. The flowing step may comprise flowing at a rate of 1.5-2.5 gallons per minute.

In some aspects, a method comprises stretching the proximal end of the elastomeric connector about a fixture; aligning the distal end of the elastomeric connector with an opening on the fixture; and flowing a liquid from the fixture through the distal end of the elastomeric connector and through the flexible, hollow hose; wherein less than 1% of the liquid escapes the proximal end of the elastomeric connector during the flowing step.

In some aspects, a method of using the connector assembly or converter hose may comprise affixing the elastomeric connector to a fixture having a smaller circumference than the inner circumference of the elastomeric connector; rolling the elastomeric connector onto itself to decrease the inner circumference of the elastomeric connector to form a leak-proof seal about the periphery of the fixture.

In some aspects, the elastomeric connector may comprise a thermoplastic elastomer; wherein the elastomeric connector has a proximal end for receiving a fixture; wherein the elastomeric connector has a wall thickness of about 1/32" to 1/2"; wherein the thermoplastic elastomer has a durometer hardness Shore Type A or Shore Type 00 value of about 1-50; wherein the thermoplastic elastomer connector comprises a thermoplastic elastomer that has a tear strength of about 1-35 kN/m; and wherein the elastomeric connector has properties and dimensions wherein, when the proximal end is attached to the fixture, less than 1% of water flowing through the connector escapes the proximal end of the elastomeric connector when water flows from the fixture through the opening.

The elastomeric connector may have properties and dimensions capable of self sealing about peripheries of various sized fixtures comprising both a tub spout with a 1" square opening and a 7" diameter round shower head when in use; wherein the properties and the dimensions provide a surface area about peripheries of the various sized fixtures to counter a force of a flow rate from the various sized fixtures when turned on; and wherein one of the properties comprises retaining the resting state dimensions after use without deforming.

The elastomeric connector may comprise a thermoplastic elastomer and the hose comprises polyvinyl chloride or silicone; wherein the connector has a wall thickness of about 1/32" to 1/2" and a length of about 3-10 inches; wherein the thermoplastic elastomer has a tensile stress at least in one direction at 100% strain or 300% at 23° C. of less than about 15 MPa; has a tensile strength at least in one direction at break of about 0.1-15 MPa; a tear strength of about 1-35 kN/m; a tensile elongation at least in one direction at break of 50% or greater; or a durometer hardness Shore Type A or Shore Type 00 value of about 1-50.

In some aspects, rigid compression fitting may comprise a rigid female cap, a rigid double sided male component, and a rigid insert of a size to fit therebetween; wherein the compression fitting has an opening therethrough when assembled; wherein the rigid female cap comprises a rim; wherein the insert comprises a tube and an approximately perpendicular flange ("insert flange"); wherein the rigid female cap comprises a rim around a first opening and a second opening through which the insert is inserted; wherein the tube and the rim of the rigid female cap have a gap therebetween when assembled; wherein the tube extends through and beyond the rim of rigid female cap; wherein the insert flange has a size and dimension that allows passage through the second opening but not the first opening; wherein the double sided male component comprises a male end that is complementary to the female cap ("complementary male end"), a male end for inserting into a hose ("male hose end") opposite the complementary male end, and a transition plane between a larger opening of the complementary male end and a smaller opening in the male hose end, wherein the transition plane is proximate the male hose end; wherein a second opening in the female cap has a larger circumference than the insert flange.

Other features and advantages will be apparent from the following detailed description, the drawings, and the claims.

BRIEF DESCRIPTION OF DRAWINGS

FIGS. 8a-8c are collectively a multiview view including orthogonal views of an embodiment of a connector.

FIGS. 9a-9b include orthogonal views of an embodiment of a hose.

FIGS. 10a-10e are collectively a multiview view including orthogonal views of an embodiment of a female cap.

FIGS. 12a-12c are collectively a multiview view including orthogonal views of an embodiment of an insert.

FIGS. 13a-13d are collectively a multiview view including orthogonal views of an embodiment of a nozzle or adapter to connect two hose portions.

DESCRIPTION OF EMBODIMENTS

Figure 1:
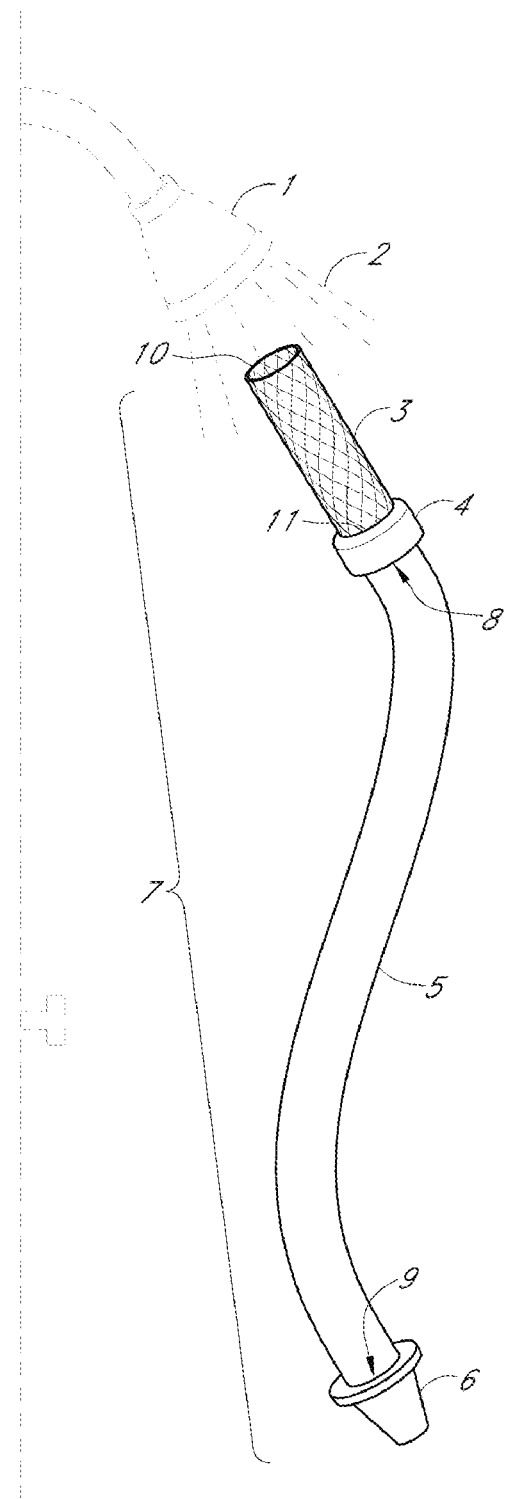
FIG. 1 is a view of an existing shower head and converter hose according to an embodiment as shown in U.S. Pat. No. 10,393,300. The nozzle on the lower end of the figure is not necessary for the converter hose to function.
Figure 2:
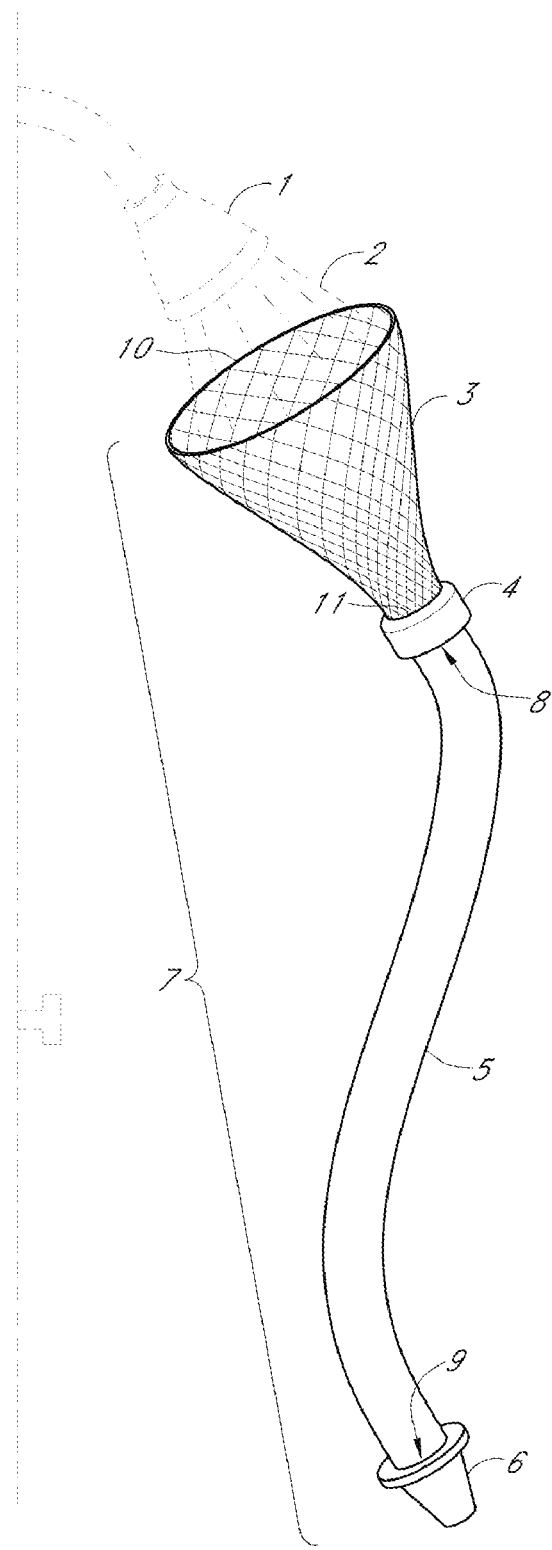
FIG. 2 is a view of the shower head and converter hose of FIG. 1, depicting how the self-sealing connector can be stretched to fit over most any size a shower head, faucet or spigot thus creating a rinsing apparatus that can easily slip off and on and, for example, allowing the same converter hose to be used in many locations where a shower head, faucet or spigot may be found. Typically, the water may be turned off before the connector is fitted to the existing a shower head, faucet or spigot.
Figure 3:
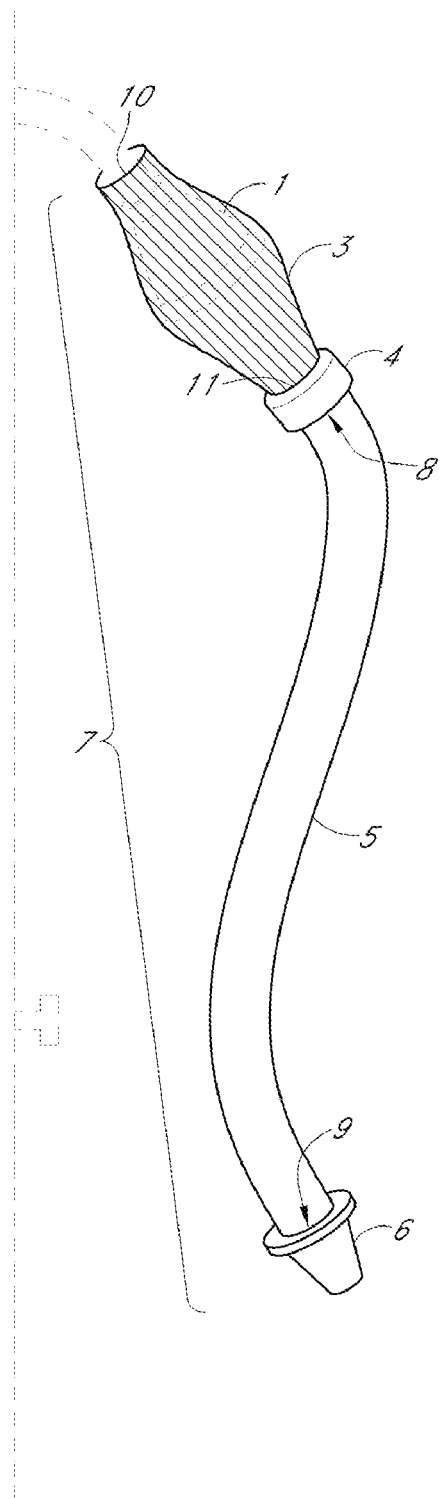
FIG. 3 is a view of the converter hose of FIGS. 1-2 depicting the connector self-sealing about the shower head during use.
Figure 4:
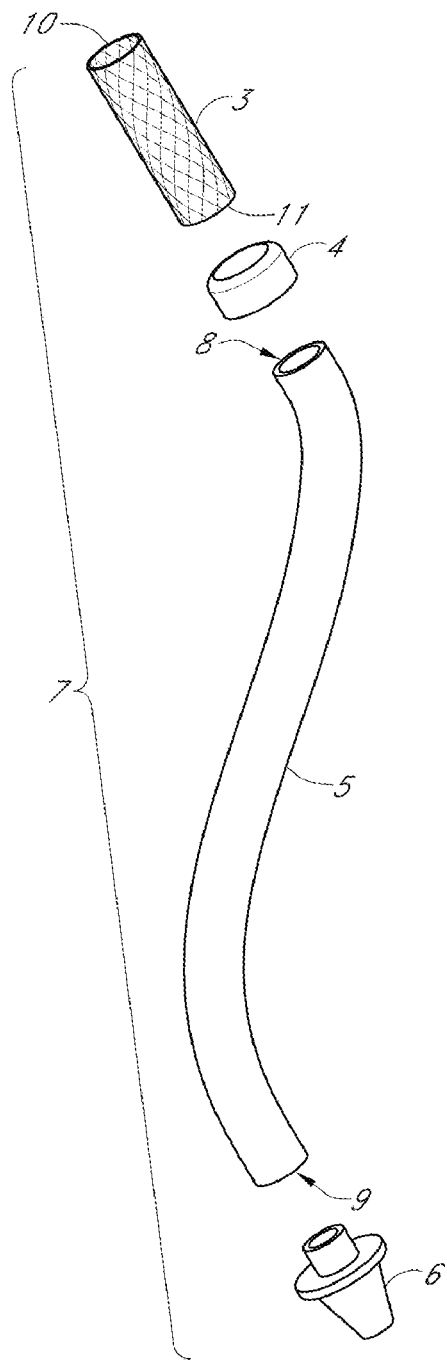
FIG. 4 illustrates the main components of an embodiment of the converter hose of FIGS. 1-3.

U.S. application Ser. No. 15/061,816, which issued as U.S. Pat. No. 10,393,300, recited a self-sealing converter hose, which prevents a substantial amount of fluid such as water to escape the proximal end of the connector during use. It was difficult to attach the relatively soft connector such as thermoplastic elastomer (TPE) connector, to relatively more rigid hose without the soft TPE connector detaching from the remainder of the converter hose after repeated use. Additional issues arose when using the converter hose as outlined below, which have been overcome using the connector assembly herein.

Couplers such as a clamp using a band, ring or other means to externally compress and attach the connector to the hose (without the connector assembly herein) did not provide a sufficiently strong coupling, and restricted flow through the distal end of the connector and/or the hose. The built up pressure caused by the restricted flow may build up during use causing the coupler to detach from the connector or the hose. Clamping may also cause the connector or hose to collapse during use, if the converter hose does not comprise the connector assembly herein.

Further, the distal end of the connector and the hose without the connector assembly herein collapsed on occasion during use with typical water pressure of a shower head, faucet or spigot. If the connector and hose were made from the same elastomeric material, the hose was not sufficiently rigid, or the hose did not have a sufficient wall thickness, and the converter hose did not have the connector assembly herein, the hose was likely to collapse when using typical water pressure. In addition to the hose, the distal end of the connector was also likely to collapse even when the hose was made from a sufficiently rigid material and had sufficient wall thickness and even when using male/female couplers, if the converter hose did not have the connector assembly herein. These issues caused inconsistencies when using the converter hose.

Moreover, it would be beneficial if one or more components of the converter hose such as the connector, coupler part, or hose were easily detachable so that the converter hose could be easily disassembled and a damaged or worn component could be replaced. It would also be beneficial if the hose could be extended to make a longer hose without having to manufacture additional parts to connect additional hoses.

Aspects of the connector assembly and converter hose herein overcome these production, usage, and/or component replacement problems.

As discussed in U.S. application Ser. No. 15/061,816, now issued as U.S. Pat. No. 10,393,300, which shares the same inventor and is assigned to the same party as the present application, an apparatus may convert most any type or size shower head, faucet or spigot into a converter hose that allows a user to redirect the flow of water in any direction allowing the user to use the water farther from the source such as to water plants, rinse shower walls, wash animals, babies, and other objects. In some aspects, a converter hose is a non-metal, self-sealing, slip on-slip off device that may be used to safely rinse shower and tub walls, which is lightweight and portable, and where a single device can be used on many different sized fixtures, for example while moving from room to room in the house. In some aspects, the converter hose may be quickly attached to and removed from a shower head, faucet or spigot.

In some aspects, as discussed in U.S. application Ser. No. 15/061,816, now issued as U.S. Pat. No. 10,393,300, a converter hose may be comprised of a connector such as a flexible, hollow connector having a proximal end and a distal end. The proximal end of the connector may be used for releasably receiving at least a portion of the shower head, faucet or spigot. When in use, the proximal end self-seals about a periphery of the shower head, faucet or spigot. The distal end of the converter may be coupled to a first end of a flexible, hollow hose.

In some aspects, the converter hose is comprised of a thermoplastic elastomer connector having a proximal end and a distal end; wherein, when in use, the proximal end self-seals about a periphery of an existing shower head, spigot or faucet and allows a liquid to free-flow through the shower head, spigot or faucet and the connector; wherein the distal end is coupled to a first end of a hose.

In some aspects of the converter hose herein, the distal end of the connector is coupled to the first end of the hose, for example, with a clamp.

In some aspects, the converter hose further comprises a hollow nozzle coupled to a second end of the hose.

In some aspects, the connector is not made from foam.

In some aspects of the converter hose herein, the thermoplastic elastomer connector comprises a thermoplastic elastomer that has a tensile stress at least in one direction measured according to ASTM D412 at 100% strain or 300% at 23° C. of less than about 15 MPa such as about 0.05-5 MPa.

In some aspects of the converter hose herein, the thermoplastic elastomer connector comprises a thermoplastic elastomer that has a tensile strength at least in one direction at break measured according to ASTM D412 at 23° C. of about 0.1-15 MPa, such as about 0.5-5 MPa.

In some aspects of the converter hose herein, the thermoplastic elastomer connector comprises a thermoplastic elastomer that has a tear strength measured according to ASTM D624 of about 1-15 kN/m such as about 5-10 kN/m.

In some aspects of the converter hose herein, the thermoplastic elastomer connector comprises a thermoplastic elastomer that has a tensile elongation at least in one direction at break measured according to ASTM D412 at 23° C. of 50% or greater, such as is about 300%-2000%.

In some aspects of the converter hose herein, the thermoplastic elastomer connector comprises a thermoplastic elastomer that has a durometer hardness Shore Type A or Shore Type 00 value measured according to ASTM D2240 for 10 seconds at 23° C. of about 1-30, such as a durometer hardness Shore Type A of about 3-15.

A method of using the converter hose herein may comprise attaching the proximal end of the connector to a shower head, faucet or spigot. The method may further comprise flowing water though the shower head, faucet or spigot, wherein the connector self-seals about the periphery of the shower head, faucet or spigot during the flowing step.

A method may further include rolling down the proximal end 110 of the connector 103 over itself so it can fit a faucet with a smaller circumference than the connector.

As recited in U.S. application Ser. No. 15/061,816, now issued as U.S. Pat. No. 10,393,300, FIGS. 1-5 illustrate exemplary embodiments of a self-sealing, slip on and off, flexible converter hose for converting many types and/or sizes of shower heads, faucets or spigots into a self-sealing rinsing apparatus, which may be used with the connector assembly herein in place of the prior version of the connector. In some aspects, the flexible converter hose is non-metal.

In some aspects as seen in the figures, the converter hose 7 includes a self-sealing, slip on slip off, connector 3, a flexible, non-metal hose 5, a clamp 4 and a nozzle 6, that may be used with an existing shower head 1. In one embodiment, a self-sealing, slip on connector 3 comprises a hollow, extremely flexible tube shaped member for receiving a shower head, faucet or spigot. The self-sealing connector 3 is comprised of a self-sealing, extremely stretchy, flexible and durable material such as a flexible thermoplastic elastomer. In some aspects, the connector is not foam.

The self-sealing connector 3, has a proximal end 10 and a distal end 11. The self-sealing connector 3 is attached, for example, to a shower head 1 by stretching and sliding the proximal end of the connector 10, over the shower head 1.

In some embodiments, a "self-sealing" connector is sufficiently flexible and has sufficient memory such that the connector does not require a clamping means, securing means, connecting means, or other mechanical means such as a ring clamp, clip, clasp, grip, a vise, a fastener, an additional flexible band, or a threaded female coupler connected to a male coupler on a spigot, to secure the connector to an existing shower head, faucet or spigot when in normal use, while preventing a substantial amount of fluid such as water to escape the proximal end of the connector during use. Thus, in some aspects, the converter hose omits the clamping, securing or connecting means at the proximal end, which may prevent the hose from slipping off the fixture and presumably prevent leakage proximate the open end of the connector, while retaining the function of leakage prevention and lack of slippage. In some embodiments, preventing a substantial amount of fluid means at least less than 10% of the amount of fluid from the source, such as less than 8%, 5%, 2% of the amount of fluid from the source, or none or almost none of the fluid, escapes during use, for example when the water is flowing at least at a medium pressure, and not merely at a very light pressure. In some aspects, no fluid or almost no fluid such as less than 1%, 0.1%, or 0.01% of the water flowing through the converter hose escapes the proximal end of the connector when in use, or all or substantially all of the fluid passes through the distal end of the connector to the hose.

Without being bound by theory, it appears that the self-sealing connector, when in use, allows the free flow of water through the connector that forms a vacuum seal about the periphery of a shower head, faucet or spigot, while the connector concomitantly has sufficient elastomeric properties to directly contact and grip a larger percentage of the shower head's, faucet's or spigot's surface area to counter the force from the flow of liquid that would be sufficient to cause other, more rigid connectors, which may be unable to grip such a large surface area on shower heads, faucets or spigots of varying sizes, to detach from the fixture. In some aspects, the length of the connector that directly contacts a shower head, faucet or spigot when in use (see e.g., FIG. 3) is at least about 30% the length in its resting state (see e.g., FIG. 1) from the center of an opening on the proximal end to the center of the opening of the distal end of the connector, such as 40%, 50%, 60%, 70%, 80%, 90% or 100%. In some aspects, the connector and the fixture do not have significant air pockets, water-holding passages, or an additional part situated between the connector and the fixture when in use, thus allowing direct contact and self-sealing around a fixture when in use.

U.S. Pat. Nos. 6,315,220, 4,413,362, 6,738,995 2,584,044, 2,326,479 5,028,077, and 1,383,987, refer to apparatuses for various uses. Conventional apparatuses for converting a faucet or existing shower head, unlike aspects of the self-sealing connector herein, may include a clamp, clamping means, or a mechanical fastener such as the mechanical slide fastener for securing a connector around a faucet or existing shower head. Conventional apparatuses may also require a spout to be coupled to a specialized nipple such as a corrugated nipple or a "casing part" (U.S. Pat. No. 2,507,535) with "retarding passages". In some aspects, the connector herein allows the free flow of a liquid therethough when in use. Conventional apparatuses, unlike aspects of the self-sealing connector, herein may also comprise rigid tubing or other rigid connectors, such as rigid plastic or metal tubing or connectors that connect the shower head or faucet, or insufficiently flexible materials such as foam, a relatively rigid rubber, or a thermoset rubber. In some aspects, the same self-sealing connector is sufficiently flexible to accept different sizes or types of existing faucets. Further, in some aspects the self-sealing connector herein does not require internal protrusions or structures to retain its self-sealing properties when in use, and the connector may be of a uniform thickness 14.

For example, U.S. Pat. No. 6,315,220 recites an "apparatus for converting a faucet or existing shower head into a flexible and extendable shower apparatus which includes an adaptable connector having one end for receiving a faucet or existing shower head . . . [and a] clamping means for releasable [sic] securing the adaptable connector around a faucet or existing shower head." In addition, this patent states that a "clamp 18 may be formed within the adaptable connector 12 to form an integral part of the adaptable connector 12. Clamp 18 can be cinched together decreasing its circumference so that the adaptable connector 12 is securely fastened about an existing faucet or shower head. Alternative means for releasable [sic] securing the adaptable connector 12 to an existing faucet or showerhead include a clip, clasp, grip, a vise, a fastener, a flexible band, or any other mechanical means that would result in a nonleak seal between the faucet and adaptable connector 12."

In addition, U.S. Pat. No. 6,738,995 refers to "an attachment unit or funnel that is placed over a faucet . . . . The attachment unit is generally cylindrical and made of a solid foam that has a closed cellular structure. The attachment unit can be screwed on and off the upper end of the hose. In a first preferred embodiment the attachment unit is configured for standard faucets, with an opening in the center of its top and a vertical channel. In a second preferred embodiment the attachment unit is configured for contemporary faucets, with an opening in the side and a curved channel." Further, the "attachment unit is made of solid foam . . . ".

Further, U.S. Pat. No. 2,584,044 states "the ring is removable and the tension of the rubber holds the connector firmly on the spout."

Also, U.S. Pat. No. 2,326,479 recites "a resilient, integral flange 5 which is adapted to be forced upwardly on the spout 2 in a manner to seal the connection against leakage. This also assists in frictionally securing the device in position on the faucet."

U.S. Pat. No. 5,028,077 states "the adapter feature means for positioning and retaining a clamp at locations whereat clamping action will effect a more positive liquid-tight seal of the adaptor about a water outlet."

In another example, U.S. Pat. No. 9,080,320 states "the boot 10 encompasses the existing shower head 36, and is secured to the supply line 38 by a thumb handle hose clamp 34, which thumb handle hose clamp encircles the neck 18 of the boot."

JP 2009293688 refers to (as translated) "a connecting means 27 for connecting the joint body 21 to the faucet 18."

U.S. Pat. No. 1,984,347 states "the shell or body of the coupling . . . is preferably formed of rubber somewhat stiffened to give sufficient strength to the body without destroying the elasticity. This elastic shell is provided with a mouth portion having an end wall 2 of a thickness sufficient to render the mouth self-sustaining so that it will substantially maintain its shape when slipping the coupling over the faucet or other pipe 3 . . . ".

U.S. Pat. No. 3,638,968 refers to "a faucet adapter fastener 16 which is wound around and fastened to a conventional faucet 17."

U.S. Pat. No. 1,543,558 refers to "[a] wing nut 8 screws on the outer end of the screw 7 against the end of the tube 6, whereby the wire 5 is contracted around the sleeve 1 and said sleeve clamped around the end of the faucet which fits in the conical interior end of the sleeve."

U.S. Pat. No. 2,507,535 states "[w]hen the faucet is turned on, water passes downwardly to chamber 20 and then to the retarding passage 21 or 21'. A back pressure is thus built up in the chamber 26 . . . with the result that the sleeve portion is tightly forced against the faucet so as to provide a leak-proof joint around the faucet end."

In some embodiments, the connector comprises a thermoplastic elastomer or any other material or mixture of materials that has similar properties. Some materials have been referred to as "super elastic plastic." In some aspects, thermoplastic elastomers (TPEs) may comprise polymers or copolymers or blends of thereof that are formulated to provide the properties outlined below. For instance, TPEs may contain block copolymers such as styrene based block copolymers including styrene-ethylene, butylene-styrene block copolymers, styrene-ethylene, propylene-styrene block copolymers, styrene-ethylene, propylene block copolymers, styrene-ethylene, ethylene propylene-styrene block copolymers, partially hydrogenated products of styrene-isoprene, butadiene-styrene block copolymers, styrene-butadiene-styrene block copolymers, or styrene-isoprene-styrene block copolymers, or a combination thereof. Thermoplastic urethanes also may be useful and may be formulated to provide appropriate properties. In some aspects, TPEs may contain a styrene butadiene styrene block copolymer or styrene ethylene butadiene styrene block copolymers.

In some aspects the TPE connector can be stretched a sufficient amount to accommodate various size shower heads, faucets or spigots, yet after being fitted on the shower head, faucet or spigot, the connector will have elastomer properties such that upon contraction, the connector self-seals about a periphery of the shower head, faucet or spigot, and when removed the connector may return to its resting shape. In some aspects, the connector having the same size in its resting state could accommodate a range of shower heads, faucets or spigots that are at least twice the size relative to the other, for example, 2-20 times the size relative to another such as 2-10, 4-16, 3-8, or 5-8 times the size relative to another. Thermoplastic elastomers or super elastic plastics are commercially available under trade names such Kraton® D2104, Dynaflex® G6713-001, Dynaflex® G6713C, Versaflex® OM9-802CL or Versaflex® CL2000X. Some or all commercial TPEs are proprietary polymers or copolymers, or blends thereof having proprietary formulations containing components such as crosslinking agents or additives, which affect the properties identified below. TPE suppliers may readily provide materials based on one or a combination of the properties below. In some aspects, a combination comprising primarily about 75% by weight Kraton® G1651 H, a clear, linear copolymer based on styrene and ethylene/butylene (with a polystyrene content of about 33%) and about 25% by weight Kang Libo 15# white oil cosmetic product are used to make the TPE connector, and secondarily, from a weigh perspective, propriety additives and dyes. The white oil lends properties to the combination making the resulting material less hard than the Kraton® G1651 H while providing similar strength and elasticity Kraton® G1651 H. For example, Kraton® G1651 H has a hardness of Shore Type A using ASTM 2240 at 10 seconds at 23° C. of 60, which may prove too hard to use as the only component for making the TPE connector. The tensile strength of Kraton® G1651 H is less than about 5.5 and the elongation at break is less than 800%, which are both in range for the material used for making the final TPE connector herein.

In some aspects, the super elastic plastic or thermoplastic elastomer may have a tensile stress at least in one direction measured according to ASTM D412 at 100% strain or 300% at 23° C. of less than about 15 MPa, such as about 0.01-10 MPa, about 0.05-5 MPa or about 0.05-3 MPa. Tensile stress of the same material may have lower values at 100% strain versus 300% strain. In some aspects, tensile stress at 100% strain at 23° C. may be less than about 10 MPa, such as about 0.01-5 MPa, about 0.03-1.5 MPa, or about 0.06-1.5 MPa, such as about 0.1, 0.2, 0.3, 0.4, 0.5, 0.6, 0.7, 0.8, 0.9, 1.0, 1.1, 1.2, 1.3, 1.4, or 1.5 MPa. Alternatively, in some aspects tensile stress at 300% strain at 23° C. may be about 0.1-10 MPa, about 0.1-5 MPa, or about 0.1-3 MPa, such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 MPa, or any range among these values.

In some aspects, the tensile strength of the super elastic plastic or thermoplastic elastomer at least in one direction at break measured according to ASTM D412 at 23° C. may be about 0.1-15 MPa, such as from about 0.1-10, 0.5-8 or 1-8 MPa, and typically have a value of about 0.5, 1, 2, 3, 4, 5, 6, 7, 8, 9, or 10 MPa, or any range among these values.

In some aspects, the tensile elongation of the super elastic plastic or thermoplastic elastomer at least in one direction at break measured according to ASTM D412 at 23° C. may be 50% or greater such as about 100%-5000%, about 200%-3000%, about 300%-2000%, or about 500%-1500%, or about 500%, 600%, 700%, 800%, 900%, 1000%, 1100%, 1200%, 1300%, 1400%, or 1500%, or any range among these values.

In some aspects, the tear strength of the super elastic plastic or thermoplastic elastomer measured according to ASTM D624 is about 1-35 kN/m, such as about 3-27 kN/m, about 5-10 kN/m, such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 kN/m, or any range among these values.

In some aspects, the stress at break of the super elastic plastic or thermoplastic elastomer measured according to ASTM D2240 may be about 1-35 kN/m, such as about 3-27 kN/m, about 5-10 kN/m, such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 kN/m, or any range among these values.

In some aspects, the durometer hardness Shore Type A or Shore Type 00 of the super elastic plastic or thermoplastic elastomer measured according to ASTM D2240 for 10 seconds at 23° C. may have a value of about 1-50, such as about 1-45, about 2-40, or about 3-15 such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or any range among these values.

In some aspects, the density of the super elastic plastic or thermoplastic elastomer measured according to ASTM D2240 or ASTM D792 may be about 0.01-5 g/cm3, about 0.5-2 g/cm$^3$, or about 0.8-1.5 g/cm$^3$, such as about 0.8, 0.9, 1.0, 1.1, 1.2, 1.3, 1.4, 1.5, 1.6, 1.7, 1.8, 1.9, or 2.0 g/cm$^3$, or any range among these values.

In some aspects, the shrinkage of the super elastic plastic or thermoplastic elastomer measured according to ASTM D2240 may be about 0.01-5%, about 0.5-2%, or about 0.8-1.5%, such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0%, or any range among these values.

In some aspects, the melt flow of the super elastic plastic or thermoplastic elastomer measured according to ASTM D2240 may be about 25-150 g/10 min, such as about 50-100 g/10 min, about 75-95 g/10 min, such as about 75, 76, 77, 78, 79, 80, 81, 82, 83, 84, 85, 86, 87, 88, 89, 90, 91, 92, 93, 94, 95, 96, 97, 98, 99, or 100 g/10 min, or any range among these values.

In some aspects, the melt flow of the super elastic plastic or thermoplastic elastomer measured according to ASTM D2240 may be about 25-150 MPa, such as about 50-100 MPa, about 75-95 MPa, such as about 75, 76, 77, 78, 79, 80, 81, 82, 83, 84, 85, 86, 87, 88, 89, 90, 91, 92, 93, 94, 95, 96, 97, 98, 99, or 100 MPa, or any range among these values.

In some aspects, the compressive strength of the super elastic plastic or thermoplastic elastomer measured according to ASTM D2240 may be about 1-50%, such as about 1-45, about 2-40, or about 3-30 such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45% or any range among these values.

In some aspects, the brittle temperature of the super elastic plastic or thermoplastic elastomer measured according to ASTM D2240 may be about −80 to −50° C., such as about −75 to −55, about −72 to −58 or about −75, −74, −73, −72, −71, −70, −69, −68, −67, −66, −65, −64, −63, −62, −61, −60, −59, −58, −57, −56, −55, −54, −53, −52, −51, or 50° C. or any range among these values.

The super elastic plastic or thermoplastic elastomer may have one or more of the properties above (e.g., tensile stress, tensile strength, tear strength, tensile elongation, or durometer hardness), such as tensile elongation and durometer hardness.

In some aspects, the connector, hose and other attachments related to the converter hose is made from materials that can withstand temperatures such as about 100-150° F. while maintaining the self-sealing attributes of the connector without deforming the converter hose.

The length of the connector may be sufficient to accommodate various shaped shower heads, faucets or spigots in its expanded state. The length may be, for example, from about 3-10 inches such as about 3-7 inches, about 4-6 inches, about 4-5 inches or about 4.5 inches in length in its resting state. The connector, such as the TPE or super elastic plastic connector, in some aspects, may have a wall thickness of about 1/32" to 1/2" thick such as about 1/16" to 1/4" thick, for example, about 1/16", 1/8", or 3/16" thickness. In its expanded state, the connector may stretch in any direction (e.g. horizontally, vertically, diagonally, lengthwise, widthwise, circumferentially, etc.) in which it is expanded about 2-20 times, such as about 4-16 or about 8-10 times, in comparison to the resting state dimensions, allowing a connector having a fixed size to accommodate various size shower heads, faucets or spigots, such as those in Example 1. By any direction e.g., horizontally, vertically, diagonally, lengthwise, widthwise, or circumferentially, refers to stretching the entire connector e.g., from one end to another lengthwise, from side to side widthwise, from corner to corner diagonally, or outwardly from a diameter circumferentially, etc. When in a stretched state, for example, when fitted to an existing shower head, faucet or spigot, the connector may have a dimension such as a diameter of a cylindrical connector at its widest part of about 0.5-10 inches, for example 1-10, 1-8, 2-5 or 2-3 inches. For example, the inner or outer diameter of a cylindrical connector may be about 0.25-10 inches, about 0.5-5 inches, about 0.5-3 inches, about 0.5-2 inches may be about 1 inch. Other shaped elastomeric connectors may have similar inner or outer dimensions from one side to the other side of the elastomeric connector, for example, between facing sides of a cuboid or prism.

The connector may have similar sized openings on either end or the distal end may be narrower than the proximal end, such as wherein the connector may have, at least partially, a funnel or conical shape, although the connector may be formed in any suitable shape that will accommodate a shower head, faucet or spigot of various sizes such as cylindrical, spherical, barrel shaped or prism shaped, rectangular prism, or variations thereof.

Aspects of the converter hose of FIGS. 1-5, which are described below, may be used except the coupler/compression fitting 117 herein replaces the clamp or securing means between the flexible hose and the self-sealing connector 3, and the self-sealing connector 3 is modified with a connector flange 120 to be used with the coupler/compression fitting 117. The flexible hose 5, has a first end 8, and a second end 9. The hose may be made from any material suitable for its purpose. In some aspects, a typical hose may be made from a flexible material. For example, the hose may be made from TPE, vinyl, polyvinyl chloride (PVC), silicone, or latex, The hose may be any suitable length, such about 0.5-20 m or greater. In some aspects, the hose length is about 1-3 m, such as about 1 m. The hose may be any suitable diameter, such about 1-100 mm (measured as inner or outer diameter). For example, inner diameter may be about 5-12 mm such as about a 9 mm and an outer diameter may be about 6-18 mm, such as about 15 mm. In some aspects, the hose is non-metal.

In some aspects, the first end 8 of the hose 5 may be connected to an open distal end 11 of the self-sealing connector 3 via a securing means (clamp) 4, or other securing means. In some aspects, the clamp 4 fits around the exterior circumference of the self-sealing, slip-on connector 3 at its distal end 11. The distal end 11 is secured to the first end 8 of the flexible hose 5 by sliding distal end 11 over the first end 8 of the flexible hose 5. The clamp 4 may be secured over the exterior of the distal end of the self-sealing connector 11 proximate the first end 8 of the flexible hose 5. In some aspects, the clamp component may be e.g., about 1/2" to 1" in width and/or has sufficient diameter to encompass the entire hose when attached to the connector. In some aspects, the self-sealing connector is positioned outside the hose.

Figure 5:
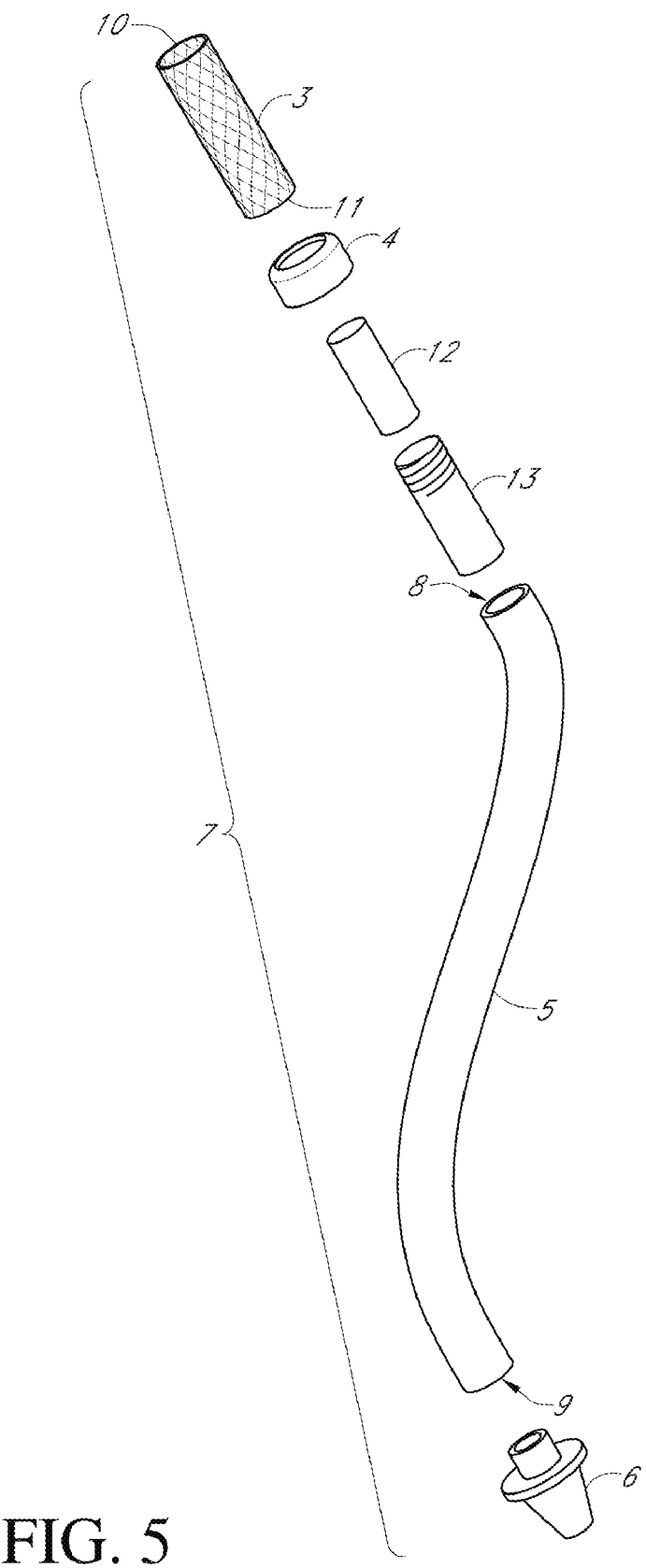
FIG. 5 illustrates an embodiment of female and male couplers connecting the connector to the hose of FIGS. 1-3.

In some aspects, instead of or in addition to the clamp, the distal end of the connector has a female coupler 12 and the first end of the hose has a male coupler 13 as shown in FIG. 5, or the distal end of the connector has a male coupler and the first end of the hose has a female coupler. In some aspects, the male or female coupler may be secured to the connector or hose, such as by a clamp 4 or glue or other securing means.

The hollow second end 9 may be connected to a hollow nozzle 6. In some aspects, if, for example, the hose is made from same material as the connector, a securing means such as a clamp, glue, and/or male and female couplers may be used to connect the hose to the nozzle. The male or female coupler proximate the hollow nozzle may be a separate part or may be integral with the nozzle. In some aspects, if, for example, the hose is made from a relatively more rigid material, a securing means may not be necessary. In some aspects, the hollow nozzle 6, if present, may be made from a rigid material such as plastic or metal, and open at both ends. In some aspects, the hollow nozzle 6 fits inside the second end of the hose 8, or the nozzle may be integral with the hose, for example if the hose is tapered proximate the second end. In some aspects, the hollow nozzle may be about ½"-3" in length such as about 1.5" in length. The width of the nozzle may depend on the size of the opening on the second end of the hose and may have corresponding sized openings. For example, the opening may be about to ¼" to ½" such as about ⅜" inner diameter and about ¼" to ½" such as about 7⁄16" outer diameter, or larger such as ½" to 2½" or larger depending on the application. The thickness of the wall of the nozzle may be about 1⁄16"-⅛" in diameter, such as about 1⁄16" thick.

The converter hose may be manufactured in a variety of ways including but not limited to injection molding or extrusion. In some aspects, the converter hose may be manufactured in a single contiguous piece where both the connector and hose are comprised of similar material, but may allow for additional attachments to the distal hose end. The converter hose may be manufactured using different material for the connector and hose. In some aspects, the converter hose comprises at least two pieces. For example, the connector may be permanently or removeably attached, molded, clamped or screwed on to the hose component with or without male and female coupling members. In some aspects, coupling members may have corresponding parts such that one coupling member on the distal end of the connector may connect to a corresponding coupling member secured to the opening of the hose so that the connector may be removed from the hose. For example the connector and the hose may be threaded, coupled, or may snap or slide together in place.

The terms "showerhead, faucet or spigot" or "fixture" used alone or together is meant to include various fixtures that dispense a liquid, typically household water fixtures, such as bathroom basin faucets, bathtub spouts, kitchen or utility room sink faucets, showerheads, or outdoor spigots for hoses among other fixtures.

Figure 6:
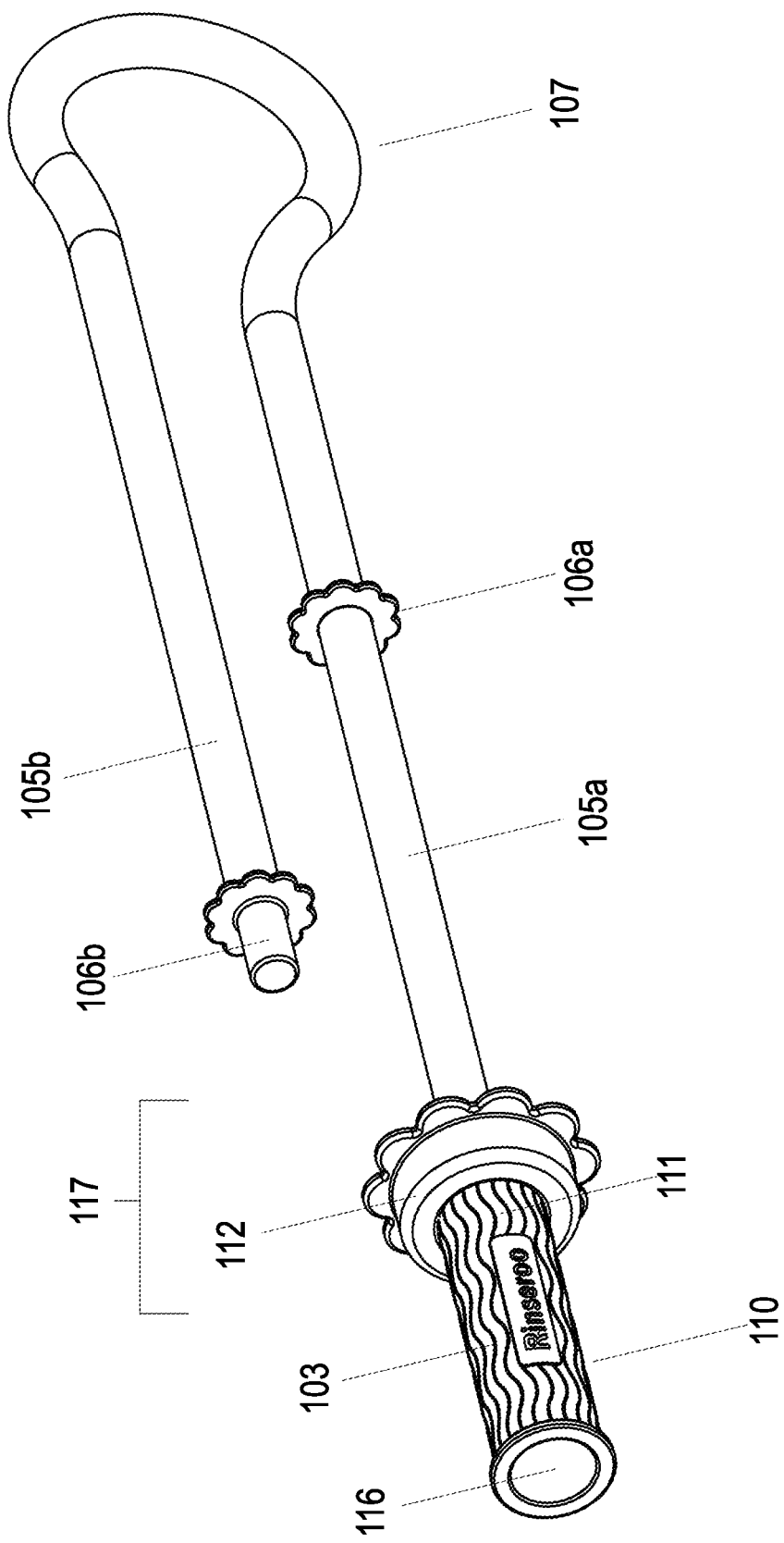
FIG. 6 is a fully assembled view of an embodiment of a converter hose comprising the connector assembly herein.
Figure 7:
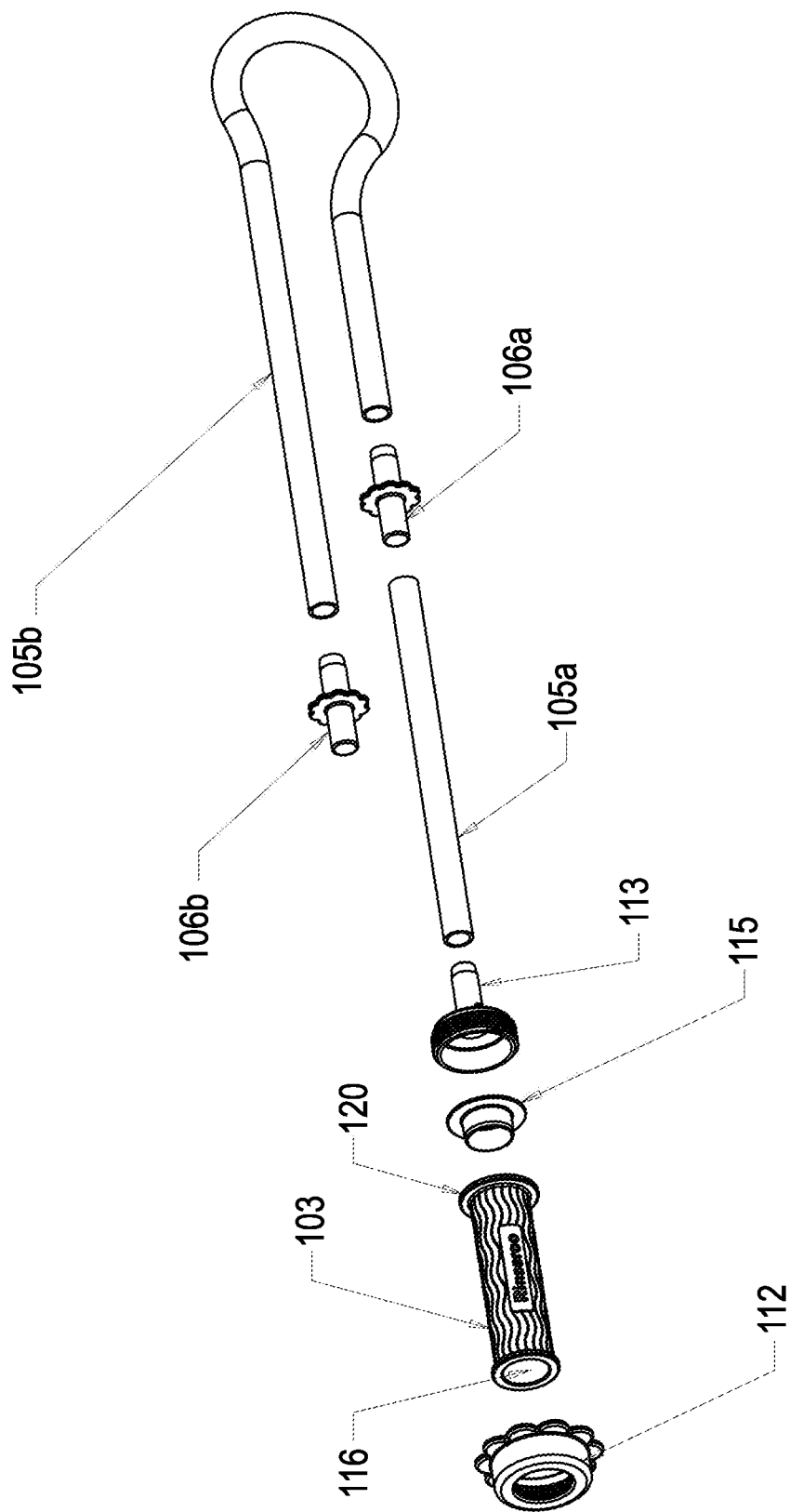
FIG. 7 is an exploded view of an embodiment of a converter hose comprising the connector assembly herein.

FIGS. 6-13 illustrate exemplary embodiments of the converter hose and aspects of the connector 103, coupler/compression fitting 117, hose 105a, 105b and nozzle 106a/106b. FIG. 6 shows an embodiment of an assembled converter hose with an extension hose and FIG. 7 shows an exploded view of the same converter hose. The connector 103 has a proximal end 110 and a distal end 111, wherein the proximal end 110 may be passed through and beyond a first opening 122 of the female cap 112 when assembled.

The elastomeric connector in more detail as in FIG. 8 may comprise an approximately perpendicular flange ("connector flange") 120 at a distal end 111 thereof and an opening 116 therethrough. The connector flange 120 is larger than the first opening 122 of the female cap 112 (FIG. 10) and is sufficiently wide so that the connector flange 120 does not slip through the first opening and can form a seal with the insert flange 141 when compressed and assembled.

The rigid compression fitting 117 when assembled may have an opening aligned with the opening of the elastic connector 103 so that a fluid may pass through the converter hose unobstructed. The components of the rigid compression fitting 117 may be made from acrylonitrile butadiene styrene (ABS) plastic or another rigid material such as polycarbonate, acrylonitrile styrene acrylate (ASA), cellulose acetate, cellulose acetate butyrate, cellulose propionate, chlorinated polyvinyl chloride, high density polyethylene, high impact polystyrene, ethylene chlorotrifluoroethylene, ethylene tetrafluoroethylene, ethylene-methyl acrylate copolymer, styrene acrylonitrile, or mixtures or copolymers thereof that have an appropriate hardness to function as described herein. In some aspects, the rigid compression fitting 117 has a durometer hardness Shore Type D value measured according to ASTM D2240 for 10 seconds at 23° C. of about 60-100 such as about 65-100, about 75-100 or about 80-100.

Figure 11:
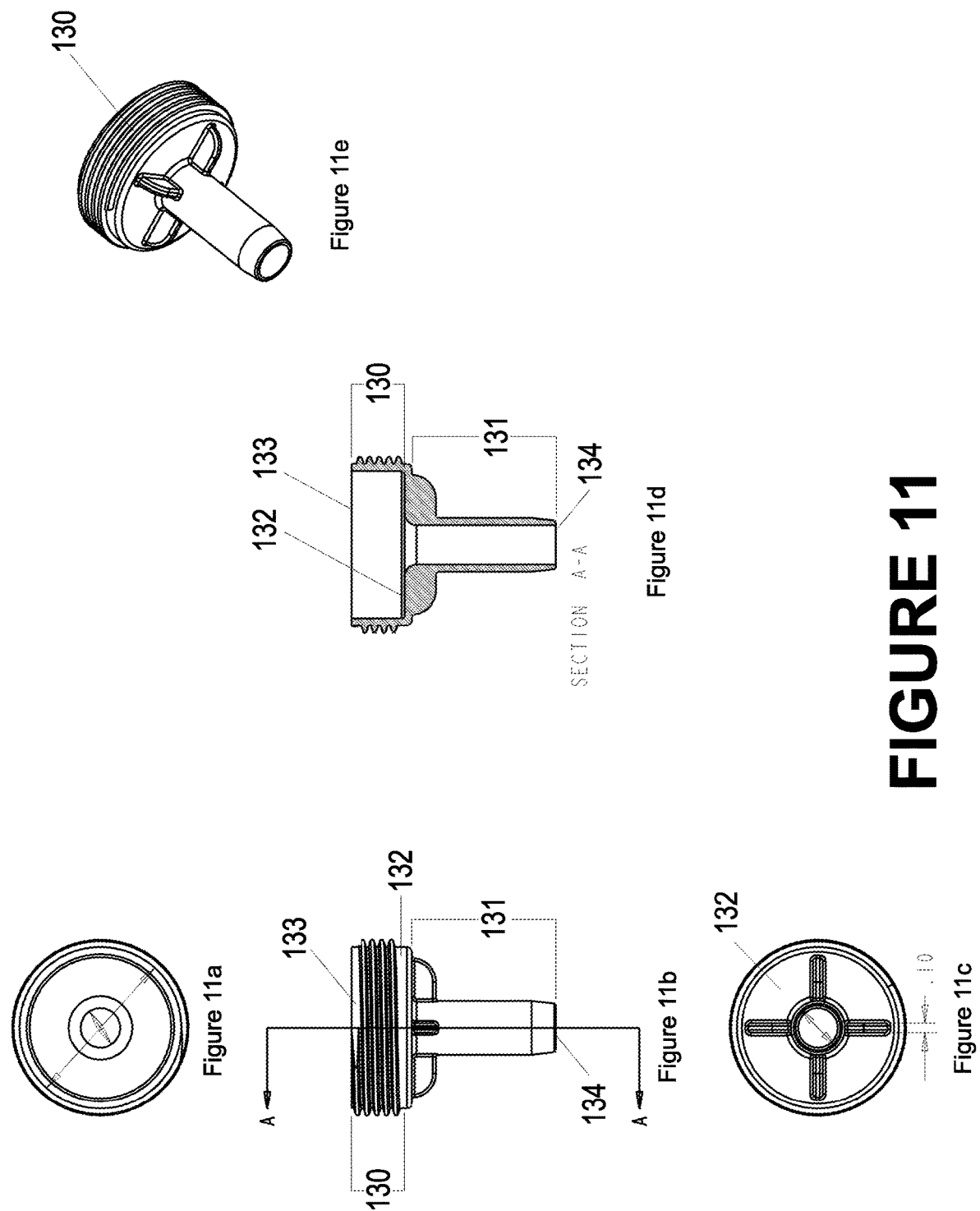
FIGS. 11a-11e are collectively a multiview view including orthogonal views of an embodiment of a double-sided male component.

The rigid compression fitting 117 may comprise an insert 115 (FIG. 12), a female cap 112 (FIG. 10) and a double sided male component 113 (FIG. 11).

The insert 115 has a first end 140 having an approximately perpendicular flange ("insert flange") 141 that is about the same dimensions or circumference as the connector flange 120 and a second end 142 having tube 143 with a length that is shorter than a length of the elastic connector 103 and dimensions or a circumference that are about the same as the inner dimensions or circumference of a cross section of the distal end 111 of elastomeric connector 103 in its resting state. For example the height of the insert 115 is about 5-20% the length of the connector 103, such as about 10-15% or about 12%. In some aspects when assembled, the insert 115 should be of a sufficient height to prevent the distal end 111 of the connector 103 from collapsing when in use. For instance, when the second end 142 of the tube 143 is inserted into the distal end 111 of the connector 103, the tube 143 may extend through and beyond the rim 121 of the female cap 112. The extension of the tube 143 beyond the rim 121 may allow the distal end of the connector 103 to remain open and prevent the connector 103 from collapsing when in use. For example, the height of the insert 115 may be about 0.4-0.6 inch for a 4-6 inch length connector 103. In this example, the combined height of the rim 121, connector flange 120 and insert flange 141 may be less than 0.4-0.6 inches such as about 0.1-0.3 inches for a 0.4 inch high insert or 0.3-0.5 inches for a 0.6 inch high insert. In determining the size of the insert 115 that may prevent the connector from collapsing, factors in addition to the length of the connector 103 may be relevant such as internal or outer diameter or cross section circumference (or other dimensions depending on the shape) of the connector 103. In some aspects, the tube 143 and insert flange 141 form a single integral insert as shown in FIG. 12.

In some aspects, the insert flange 141 and the connector flange 120 are compressed together against the rim 121, which may prevent the connector from detaching, and in addition, when compressed, a seal is formed when assembled, which may prevent leakage from the point of coupling when the converter hose having the connector assembly 103/117 is in use. Thus, the insert flange 141 and the connector flange 120 may be of a sufficient size so that the connector flange 120 can be securely held in place by the insert flange 141 to prevent the connector flange 120 from detaching when water flows through either the converter hose 107 or the connector assembly 103/117. In addition, in some aspects, the insert flange 141 provides sufficient surface area to compress against the connector flange 120. In some aspects, the insert flange 141 and the connector flange 120 may be about the same size and both can fit inside the internal outermost edges of the female cap 112. Thus, the insert flange 141 has smaller dimensions (e.g., diameter, circumference) than the female cap 112 so it may fit inside. Therefore, the insert flange 141 may have a size and dimension that allows passage through the second opening 123 but not the first opening 122 of the female cap 112. In addition, a gap between the tube 143 and the rim 121 may allow the connector 103 to fit within the space when assembled. In some aspects, the gap is approximately the size and shape of a cross section of the distal end 111 of the connector 103 (FIG. 8c and FIG. 12a).

As discussed above and as shown in FIG. 10, the female cap 112 comprises a rim 121 that may form a first opening 122 having a smaller circumference than the insert flange 141, and a second opening 123 having a larger circumference than the insert flange 141. The first opening 122 may have approximately the same dimension as the cross sectional outer circumference of the elastomeric connector 103 when in a resting state. The first opening 122 also may have a smaller circumference than the circumference of the insert flange 141 and a larger outer circumference than an outer circumference of the tube 143. When "circumference" is used comparatively, the cross sections where the parts meet or portions referenced are approximately similarly shaped (e.g., round, square or rectangular) so the parts fit together in a way that the connector assembly functions as intended. For example, if the cylindrical elastomeric connector 103 has an outer diameter at its widest part (not including any flange portion) of about 0.5-10 inches, for example 1" to 10", 1" to 8", 2" to 5", 2" to 3", 1" to 3", or 1" to 2" such as about 1.5 inches, then the diameter of the first opening 122 has about the same diameter, and thus the same circumference. A cuboid shaped connector may have the same dimensions, such as a cross section having a length and width, and therefore circumference, as a rectangular first opening 122 having a similar length and width. In this example, the insert 115 would also have a compatible shape and dimensions to fit inside the connector. Thus, the connector 103 can fit through the opening and extend outside the female cap 112 with no gap (which includes a minimal gap) between the rim 121 and the distal end of the connector 111. The connector flange 120 may remain inside the female cap 112 against the rim 121 when assembled.

The second opening 123 may receive a complementary male end 130. In some aspects, both the female cap 112 and the complementary male end 130 are threaded and can be coupled to form a tight closure. Other closures are also contemplated such as a cam and follower, a snap, a slide or other closure that can compress the complementary male end 130 against the insert flange 141, connector flange 120 and rim 121 of the female cap 112 when assembled. The closure allows the connector flange 120 on the distal end 111 of the connector 103 to stay connected to the compression fitting 117 without readily detaching from the compression fitting 117 when attached to a fixture or when in use as a converter hose.

It is beneficial if the height of the female cap 112 (the distance between the outside of the rim 121 and the entrance to the second opening 123, see FIG. 10c) is sufficient to accommodate the insert flange 141, connector flange 120, and complementary male end 130. The height of the female cap 112 depends on the dimension of the components that will be inserted therein and the dimension of the remainder of the components, and may have a height of about ¼" to 5", ½ to 3", ⅝" to 1", or ¾" to ⅞". The second opening 123 may have larger dimensions than the first opening 122. A cylindrical second opening 123, for example, may have a diameter of about 0.5-12 inches, for example 1-10, 1-8, 1-5, 1-3, or 1.5-2.5 inches. See FIG. 10e.

In some aspects, the compression fitting 117 further comprises a double sided male component 113, for example in FIG. 11. One male end may be complementary to the female cap ("complementary male end") 130 and a second male end may insert into a hose ("male hose end") 131 and positioned opposite the complementary male end 130. In some aspects, if the connector 103 is larger than the hose 105, between both ends may be a transition plane/portion 132 between a larger opening 133 of the complementary male end 130 and a smaller opening 134 in the male hose end 131. The double sided male component 113 may be integral with the insert flange, or may be separate components (e.g., FIG. 11, FIG. 12).

The larger opening 133 of the double sided male component 113 may have dimensions that are slightly smaller than the second opening 123 of the female cap 112 but of sufficient size or dimension to engage the female cap 112. The larger opening 133, for example, may have a diameter of about 0.5-12 inches, for example 1-10, 1-8, 1-5, 1-3, or 1.5-2.5 inches. See FIG. 11a.

In some aspects, the height (FIG. 11d) of the complementary male end 130 may have dimensions that have a sufficient size to engage the female cap 112. The height of the complementary male end 130, for example, may be about as ⅛" to 4.5", ¼" to 3", ¼" to 2", ¼" to 1" or about ½" to ¾".

The outer dimensions of the male hose end 131 may have circumferences or diameters that are similar to the inner circumference or diameter of the hose 105. In some aspects, when engaging a typical cylindrical hose, the outer diameter of the male hose end 131 may be about ⅛" to 5", ¼" to 3", ¼" to 2", ¼" to 1", such as about ¼" to ¾", or about a ½" outer diameter.

The male hose end 131 may have a sufficient length to engage the hose 105 and form a seal. The end of the male hose end 131 that is inserted onto the hose may be tapered to ease insertion therein (FIG. 11b). The length of the male hose end 131 depends on the size and material of the hose, and the size of the compression fitting. In some aspects, when engaging a typical cylindrical hose, the length of male hose end 131 may be about ½" to 4", ½" to 3", ½" to 2", 1" to 2", or about 1.5 inches in length.

In some aspects, the nozzle 106b can act as a hose extension connector 106a to add at least one length of hose to the converter hose to make it longer. Thus, the hose could be extended to make a longer hose without manufacturing additional parts to connect additional hoses. In some aspects, the nozzle 106 has an insert end 150, a center portion 151 and a nozzle end 152. The insert end 150 nozzle end 152 may be interchangeable.

In some aspects, the edges of the complementary male end 130 may compress the insert flange 141 and the connector flange 120 against the rim 121 of the female cap when assembled.

Typically, the components herein have cylindrical openings or are made to accommodate a cylindrical connector and hose as shown in the figures; however, other shapes are not precluded and the converter hose may be customized to complement a particularly shaped or sized fixture. Generally, due to the elastomeric nature of the connector, a cylindrical connector can accommodate most shaped fixtures such as those that are round, square, rectangular, hexagonal, and can fit over entire fixtures such as outdoor hose bibs including the wheel handle, and bathroom sink faucets including the drain stopper, for example. Nonetheless, other shaped connectors are contemplated, for example, such as cuboid, cube, cone/funnel, prism, or pyramid shaped connectors having openings on both ends, or for instance any shape having a round, square, triangular, rectangular, hexagonal or multi-sided cross section. Connector shapes need not be symmetrical and can include an asymmetrical hourglass, wavy, or custom shape, which could be similarly beneficial in particular applications. The compression fittings and hose may also match the shape of the connector.

The rigidity of the hose 105 may be one factor for the hose 105 to function effectively without collapsing. In some aspects, the hose 105 is made from a material that is more rigid than the connector. In some aspects, the hose 105 is less rigid than the compression fitting 117. For example, hose material may have a durometer hardness Shore Type A value measured according to ASTM D2240 for 10 seconds at 23° C. of about 55-100 such as about 60-100, about 60-80 or about 60-70, for example, about 65.

In some aspects, the wall thickness also may be a factor in providing a hose 105 that will not collapse. The hose 105 may have a wall thickness of about 1/32" to 1/2" thick such as about 1/16" to 1/4" thick, for example, about 1/16", 1/8", or 3/16" thickness. A hose material may be selected based on a combination of durometer and wall thickness to arrive at an effective converter hose herein. For example, a hose 105 with a relatively thinner wall may comprise a material with a higher Shore Type A durometer hardness, while a thicker wall may comprise a material with a lower Shore Type A durometer hardness. In some aspects, the hose 105 may have a wall thickness of about 0.01-1.5" such as about 0.02-0.8", about 0.05-0.8", about 0.05-0.5", about 0.08-0.3", or about 0.09-0.2", for example, about 0.1" or about 0.2". In some aspects, the hose 105 may have a wall thickness of about 1/32" to 1/2" thick such as about 1/16" to 1/4" thick, for example, about 1/16", 1/8", or 3/16" thickness.

The inner dimensions such as the diameter of the hose 105 may also be a factor in providing a hose 105 that will not collapse (FIG. 9a, inner arrows). The inner dimensions such as the diameter also may influence the rate of flow. In some aspects, the inner dimensions such as the diameter are smaller than the dimensions such as the diameter of the larger opening 133 of the complementary male end 130. In some aspects, in a typical cylindrical hose, the inner diameter may be about 1/8" to 5", 1/4" to 3", 1/4" to 2", or 1/4" to 1", such as about 1/4" to 3/4", or about a 1/2" inner diameter. The outer diameter of the hose 105 takes into account the wall thickness and may be about 1/4" to 5", 1/4" to 3", 1/4" to 2", 1/4" to 1", such as about 1/2" to 1", or about 3/4" outer diameter, or even larger such as 1/2" to 21/2" or larger depending on the application (FIG. 9a, outer arrows).

In some aspects, the components of the converter hose, such as the connector, compression fitting, nozzle and hose, are easily detachable so that if one component became damaged or worn out, the converter hose could be disassembled and only the damaged component would need to be replaced.

The terms "approximately" "about" and "substantially" as used herein represent an amount close to the stated amount that still performs the desired function or achieves the desired result. For example, the terms "approximately," "about" and "substantially" may refer to an amount that is within less than 10% of, within less than 5% of, within less than 1% of, within less than 0.1% of, and within less than 0.01% of the stated amount.

All patents and publications referenced herein are incorporated herein by reference.

EXAMPLES

Example 1

A TPE super elastic plastic cylindrical connector about 5" long and having about a 1" diameter in its resting state was coupled using a band to an approximately 3' silicone hose to make a converter hose. The converter hose was fitted over household fixtures of various sizes, namely:

a curved tub spout with an approximately 1.5" diameter round opening;

an approximately 1.5" diameter round water-saving shower head;

a standard tub spout that extends perpendicularly from the wall and curves to provide a downward flow of water and having an opening of approximately 1" square;

an approximately 3" diameter round shower head;

an approximately 7" diameter round shower head; and a rectangular tub spout measuring approximately 2" by 1.5".

The proximal open end of the connector was stretched about and affixed to each of the water fixtures above, roughly aligning the opening on the hose on the distal end of the connector in the same direction as the spout or faucet opening, allowing water to flow from the spout or faucet opening to the distal opening between the connector and the hose. The water handle for each fixture then was turned on to approximately one eighth of a full turn for 10 seconds, which delivered a medium pressure flow, which would be sufficient for rinsing the shower or tub, household items, and bathing animals, such as dogs. The same connector portion fitted over each of the fixtures did not leak at all except when used with the rectangular tub spout. The rectangular tub spout leaked 3 droplets initially until the connector was sealed to the spout after the water began to flow through the hose and exited the second end of the hose, at which time leakage ceased for the remainder of the 10 second test period. Measurement of the 3 droplets as a fractional amount of an ounce was difficult to approximate in the measuring vessel. Using a conversion calculator at the found at www.unitconversion.org/volume/drops-to-fluid-ounces-us-conversion.html, 3 drops of water converts to about 0.005 oz leakage.

Water flow rates from a shower head is typically about 1.5-2.5 gallons per minute (GPM), which converts to 3.2-5.3 ounces per second, while bath tub water flow rates are typically about 2.5-4 GPM or 5.3-8.5 ounces per second. Assuming the maximum typical flow weight or 85 ounces in 10 seconds had passed through the converter hose, means 0.005/85 or about 0.006% leakage for this fixture over 10 seconds. This percentage would be even lower if a weaker flow rate was used or the amount was calculated over the entire length of time the water was flowing. These experiments showed substantially no water leakage for fixtures of various sizes and shapes.

In addition to the experiments above, the converter hose was used at various water temperatures including typical showering temperatures of approximately 100-120° F. The connector did not become loosen from any of the fixtures or become deformed when water ran through the fixtures at these temperatures, or cause leaks due to heat.

Comparative Example 1a

The Danco 10086 Versa Spray Handheld Shower "Versa" was tested. The connector had a round opening and curved to meet the 42" vinyl hose such that the opening of the connector and the opening of the hose were approximately perpendicular relative to each other. The hose appeared to be made from a relatively rigid rubber. The converter hose was attempted to be fitted over the six household fixtures as in Example 1. The only faucet or shower head that was able to be fitted, although with significant difficulty, was a) the curved tub spout with an approximately 1.5" round opening. The connector portion was unable to fit over any other fixture. The water handle that regulates the flow of water for the curved tub spout was turned on to one eighth of a full turn for 10 seconds. Approximately 15 ounces of water was collected from the leak where the connector met the tub spout over a 10 second testing period. The leakage rate did not appear to slow down when the water flowed through Versa for more than 10 seconds.

Using the highest typical bath tub flow rates identified in Example 1 of 8.5 oz/sec, about 85 ounces of water would have flowed through the Versa from the tub spout in the 10 second testing period. The percent leakage is 15 oz/85 oz or about 18% leakage. Versa is available online on Amazon.com. Various Amazon.com reviewers of Versa stated "stiff top," "sprays water out the back," and "difficult to get on." The product packaging also notes that consumers with "weak arm strength" may have a difficult time using it.

Comparative Example 1b

Amazon.com offers Lasco 08-2180 Slip on to Faucet Rubber Hose and Spray "Lasco," that provides dimensions of "3.5×10.2×7.8 inches" and the customer question and answers states "the diameter of the end that attaches to the faucet . . . goes from 1½" down to ½"." Various Amazon.com reviewers of Lasco stated: "Keeps popping off the faucet," "Does not fit over tub faucet (which is why I ordered it), will fit sink though," "The nozzle fell off within five minutes," "doesn't fit or stay on any of my faucets," "you can't have the water pressure be too strong." "way to [sic] small to fit on any of my faucets."

Comparative Example 1c

Amazon.com offers Holmz-Selfix 04430201.04 Slip-On Portable Shower "Holmz," that provides dimensions of "2.5×9×15 inches" and the customer question and answers states "I tried to put this on a sink faucet, and on a garden hose faucet mouth. It was too big for both." The appearance is similar to Versa in comparative Example 1a. Various Amazon.com reviewers of Holmz stated: "The section that is supposed to 'fit' over the faucet is made of a hard thick material rather than a rubberized funnel that can fit tightly enough around the faucet . . . . Instead, no matter how you twist and turn and try to get it to cover the faucet, the end result is always water spout every which way except through the shower head!," "the product dimensions on Amazon did not reveal what is clearly printed on the package, that it fits faucets 1⅜" to 1¾" in diameter. My faucet is closer to 2," "my tub faucet spout is square and too wide for the attachment to fit over it," "doesn't fit anything in my apartment. The [sic] 'universal' end is so small that you can't even stretch it over any faucet," "If you use it with warm to hot water it get's [sic] soft and starts to come off the faucet. I had to use a ring clamp to keep it on," "doesn't fit a square tub faucet," "Jumps off the faucet as soon as the water pressure increases beyond weak."

Example 2

A cylindrical connector as illustrated in FIGS. 6-13 was manufactured from TPE super elastic plastic cylindrical connector is made from a propriety blend comprising primarily about 75% Kraton™ G1651 H Polymer, a clear, linear copolymer based on styrene and ethylene/butylene with a polystyrene content of 33% and about 25% Kang Libo 15# white oil cosmetic product, as well as other additives.

The connector was about 4.5" long, having an internal diameter of about 1". The distal end of the connector was produced with an approximately perpendicular and integral flange having a diameter of about 1.7". The outer diameter of the connector, not including the flange was about 1.25" and had a wall thickness of about ⅛".

A compression fitting was manufactured from acrylonitrile butadiene styrene (ABS) plastic having 3 parts: the insert, the female cap and a male component.

The insert was manufactured with a flanged base having a 1.7" diameter approximately perpendicularly (<91°) and integrally connected with an approximately 0.6" length tube having an internal diameter of about 1.1". The wall thickness was about 0.06".

The female cap was manufactured having a height of about 0.8" with a 1.85" diameter threaded opening on one end for accepting a male component, and a 1.25" diameter opening on the other end for accepting the connector. The female cap also comprised a decorative scalloped edge near the opening for receiving the male component.

A male component was manufactured with an approximately 0.55" threaded end for inserting into and securing the female cap, and an approximately 1.5" long tube portion having an approximately 0.4-0.6" internal diameter opening and appropriate dimensions for inserting into the hose.

An approximately 2.5'-3' long flexible hose made from polyvinyl chloride (PVC) having an internal diameter of about 0.5" was manufactured having a wall thickness of about ⅛"-¼".

The converter hose was assembled as illustrated in FIG. 7 and resulted in a converter hose as in FIG. 6.

Example 3

The converter hose of Example 2 was affixed to fixtures of different sizes and shapes including those described in Example 1 such as the about 1" diameter fixtures and about 7" diameter fixtures as well as square and rectangle fixtures. The converter hose was affixed to a fixture, used to transfer water through the hose, detached, transferred and then affixed to the different sized and shaped fixtures as in Example 1. This process was repeated over 500 times without the connector detaching from the coupler and without the hose collapsing.

Comparative Example 2

A converter hose was manufactured and assembled with a connector that did not have a flange at one end and without the compression fitting as in Example 1. A band made from rubber was used to clamp together the connector and hose. This band detached from the connector and the hose during use while using typical water pressure from a faucet, tub spout and shower head.

Comparative Example 3

A male and female coupler was made as in Example 2 without the insert. The connector detached during use while using typical water pressure from a faucet, tub spout and shower head.

The invention claimed is:
1. A connector assembly comprising
an elastomeric connector having an opening therethrough comprising a body portion and connector flange portion at a distal end thereof;
wherein the connector flange portion is approximately perpendicular to the body portion;
a rigid compression fitting having an opening aligned with the opening of the elastomeric connector;

wherein the rigid compression fitting comprises a female cap, a double sided male component, and an insert having dimensions to fit therebetween;
wherein the insert comprises a tube portion and an insert flange portion, wherein the insert flange portion is approximately perpendicular to the tube portion;
wherein the insert flange portion is proximate a first end of the insert and is about the same circumference as the connector flange portion; and
wherein the tube portion is proximate a second end of the insert and has a length that is shorter than a length of the elastomeric connector and has an outer circumference that is about the same as an inner circumference of the elastomeric connector.

2. The connector assembly of claim 1
wherein the female cap and the first end of the double sided male component are threaded.

3. A converter hose comprising
the connector assembly of claim 2; and
a hose that is more rigid than the elastomeric connector and less rigid than the compression fitting.

4. A method of using the connector assembly of claim 2 comprising
attaching the proximal end of the elastomeric connector to a fixture or the end of a vacuum cleaner hose.

5. The connector assembly of claim 1
wherein the double sided male component comprises a male cap end that is complementary to the female cap, and a male hose end that inserts into a hose when in use opposite the male cap end;
wherein the female cap comprises a rim that forms a first opening approximately the same dimension as the outer circumference of the elastomeric connector;
wherein a second opening in the female cap has a larger circumference than the insert flange portion;
wherein when assembled:
the tube portion is positioned inside the distal end of the elastomeric connector and the insert flange portion rests against the connector flange portion;
wherein most of the elastomeric connector and some of the tube portion extend through the first opening of the female cap;
wherein the connector flange portion rests against an inner surface of the rim; and
wherein the insert flange portion and the connector flange portion are compressed against the rim forming a seal.

6. The connector assembly of claim 5 further comprising
a transition plane between a larger opening of the male cap end and a smaller opening in the male hose end.

7. A converter hose comprising
the connector assembly of claim 6; and
a hose that is more rigid than the elastomeric connector and less rigid than the compression fitting.

8. A method of using the connector assembly of claim 6 comprising
attaching the proximal end of the elastomeric connector to a fixture or the end of a vacuum cleaner hose.

9. A converter hose comprising
the connector assembly of claim 5; and
a hose that is more rigid than the elastomeric connector and less rigid than the compression fitting.

10. A method of using the connector assembly of claim 5 comprising
attaching the proximal end of the elastomeric connector to a fixture or the end of a vacuum cleaner hose.

11. A converter hose comprising
the connector assembly of claim 1; and
a hose that is more rigid than the elastomeric connector and less rigid than the compression fitting.

12. A method of using the connector assembly of claim 1 comprising
attaching the proximal end of the elastomeric connector to a fixture or the end of a vacuum cleaner hose.

13. A converter hose comprising
an elastomeric connector having an opening therethrough comprising a body portion and connector flange portion at a distal end thereof;
wherein the connector flange portion is approximately perpendicular to the body portion;
a rigid compression fitting having an opening aligned with the opening of the elastomeric connector;
wherein the rigid compression fitting comprises a female cap, a double sided male component, and an insert having dimensions to fit therebetween;
wherein the insert comprises a tube portion and an insert flange portion, wherein the insert flange portion is approximately perpendicular to the tube portion; and
a hose that is more rigid than the elastomeric connector and less rigid than the compression fitting.

14. The converter hose of claim 13
wherein the elastomeric connector has a wall thickness of about $\frac{1}{32}$" to $\frac{1}{2}$".

15. The converter hose of claim 14
wherein the wall thickness is about $\frac{1}{16}$" to $\frac{1}{4}$".

16. The converter hose of claim 15
wherein the properties and the dimensions provide a surface area about peripheries of various sized fixtures to counter a force of a flow rate through the various sized fixtures when in use.

17. The converter hose of claim 13
wherein the elastomeric connector has properties and dimensions wherein when in use a single elastomeric connector self seals about peripheries of a round fixture and a rectangular fixture.

18. The converter hose of claim 13
wherein the elastomeric connector comprises a thermoplastic elastomer having a durometer hardness Shore Type A or Shore Type OO value of about 1-50.

19. The converter hose of claim 13
wherein the elastomeric connector comprises a thermoplastic elastomer having a durometer hardness Shore Type A value of about 1-30.

20. The converter hose of claim 13
wherein the thermoplastic elastomer connector comprises a thermoplastic elastomer that has a tear strength of about 1-35 kN/m.

21. The converter hose of claim 13
wherein the elastomeric connector has a length of about 3-10 inches.

22. The converter hose of claim 13
wherein the hose comprises silicon or polyvinyl chloride.

23. The converter hose of claim 13 further comprising
a nozzle attached to a second end of the hose.

24. The converter hose of claim 13
wherein a single elastomeric connector has properties and dimensions capable of self sealing about peripheries of fixtures comprising both a 3" diameter shower head and a 2" by 1.5" rectangular tub spout when in use.

25. A method of using the converter hose of claim 14 comprising
attaching the proximal end of the elastomeric connector to a fixture or the end of a vacuum cleaner hose.

* * * * *